Patented Aug. 24, 1948

2,447,523

UNITED STATES PATENT OFFICE 2,447,523

CATALYTIC HYDROGENATION OF 2,4-DIAMINO-5-NITROSO-6-HYDROXY PYRIMIDINE

Ralph Mozingo, Elizabeth, and Gunther S. Fonken, Paterson, N. J., assignors to Merck & Co., Inc., Rahway, N. J., a corporation of New Jersey No Drawing. Application November 13, 1946, Serial No. 709,436

11 Claims. (Cl. 260—251)

This invention is concerned with novel processes for manufacturing intermediates useful in the synthesis of folic acid; more particularly it relates to the preparation of 2,4,5-triamino-6-hydroxy-pyrimidine by catalytic hydrogenation of 2,4-diamino-5-nitroso-6-hydroxy-pyrimidine.

2,4-diamino-5-nitroso-6-hydroxy-pyrimidine has been reduced according to prior art methods using ammonium sulfide, at about 100° C., as the reducing agent, but the product obtained according to this method is contaminated with other materials, among them being elemental sulfur and sulfides. The yield of impure 2,4,5-triamino-6-hydroxypyrimidine obtainable by chemical reduction processes has been limited to about 92% of theoretical amount. The purification of this crude product by recrystallization from water, in which solvent the differential solubility of the pyrimidine compound is small, necessarily results in a much lower yield of pure product. In view of the difficulty of separating the 2,4,5-triamino-6-hydroxy-pyrimidine from these impurities, the direct preparation of a pure product is desirable. This is in fact accomplished by the catalytic hydrogenation processes described below.

Applicants' discovery that it is possible to hydrogenate 2,4-diamino-5-nitroso-6-hydroxy-pyrimidine in the presence of aqueous alkali, in which said compound is substantially insoluble, is unexpected; attempts by applicants to hydrogenate this compound in aqueous acid solution have been unsuccessful. It is particularly surprising that this hydrogenation can be carried out at room temperature whereas prior chemical methods employed a reduction temperature of about 100° C. It could certainly not be predicted that when 2,4-diamino-5-nitroso-6-hydroxy-pyrimidine is catalytically hydrogenated employing this low temperature procedure, that the 2,4,5-triamino-6-hydroxy-pyrimidine obtained can be isolated directly from the reaction mixture in substantially pure form and in a practically quantitative yield, since it might be expected that hydrogenation of the double bonds in the pyrimidine ring might also take place.

In carrying out the presently invented process, a mixture of 2,4-diamino-5-nitroso-6-hydroxy-pyrimidine, an aqueous alkaline solution, and a hydrogenation catalyst, is agitated in the presence of hydrogen, whereby the nitroso grouping in the 5-position is reduced to a 5-amino substituent.

The concentration of the aqueous alkaline solution employed, such as aqueous sodium hydroxide, aqueous potassium hydroxide, and the like, is not critical, although it has been found convenient to employ a solution of about 0.10 normal to about 1.0 normal concentration. The molecular proportion of aqueous alkali can likewise be varied without appreciably affecting the yield of hydrogenation product, but it is presently preferred to use between one and two and one-half stoichiometrical equivalents of alkali for one equivalent to the pyrimidine compound being hydrogenated.

The hydrogenation catalysts which are ordinarily employed by applicants, include palladium, platinum or platinum oxide, and Raney nickel, as well as combinations of said catalysts with a carrier such as activated charcoal.

The hydrogen is preferably maintained at a pressure of about 20–40 lbs. per square inch during the reaction, but higher or lower pressures may be employed if desired. The temperature of the reaction can be varied from room temperature up to about 75° C., but it is a preferred feature of the presently invented process that the hydrogenation can be carried out at about 30° C., whereby the formation of hydrolysis products, products resulting from the reduction of double bonds in the pyrimidine ring, and other undesired by-products is avoided, with the result that a practically quantitative yield of substantially pure 2,4,5-triamino-6-hydroxy-pyrimidine can be separated directly from the reaction solution.

The hydrogenation is conveniently controlled by employing approximately twice the theoretical quantity of hydrogen at an initial pressure of about 40 lbs. per square inch, and agitating the reaction mixture until the pressure drops to approximately 20 lbs. per square inch which corresponds to the absorption of approximately two stoichiometric equivalents of hydrogen. The product, the 2,4,5-triamino-6-hydroxy-pyrimidine, is soluble in aqueous alkaline solution, whereas the starting material, the corresponding 5-nitroso compound, is substantially insoluble. As the reaction progresses, the suspension of insoluble starting material is gradually converted to a solution containing the alkali salt of the product. After the reaction is complete, the reaction solution is filtered from the catalyst, and the filtrate is added to an aqueous mineral acid solution and this solution is cooled to approximately 0 to 10° C. whereby the corresponding mineral acid salt of 2,4,5-triamino-6-hydroxy-pyrimidine crystallizes in practically quantitative yield. It is recovered by filtration and washed with a small quantity of water, in which it is substantially insoluble, and dried. The product, which is substantially pure, can be used without further treatment in the synthesis of folic acid.

The following examples illustrate methods of carrying out the present invention but it is to be understood that these examples are given by way of illustration and not of limitation.

Example 1

Seven and seven-tenths grams (0.05 mole) of 2,4 - diamino- - nitroso - 6 - hydroxy-pyrimidine were placed in a 500-ml. hydrogenation bottle and 125 ml. of aqueous N sodium hydroxide were added. Two and five-tenths grams of reduced palladium on Darco G-60 catalyst (5% Pd) were added, and the mixture was allowed to shake under 20-40 lb. hydrogen pressure until no more hydrogen was absorbed. A pressure drop of 19.5 lbs. was observed to take place in 38 minutes. A drop of 19 lbs. corresponded to 0.10 mole of hydrogen. No further pressure drop was observed after 4 additional minutes. The mixture was filtered, the filtrate being run directly into 25 ml. of aqueous 18 N sulfuric acid solution. The product precipitated almost immediately. The mixture was cooled in an ice-bath to 0-10° and the product was recovered by filtration. The filter cake was washed with three 15-ml. portions of water and was dried in air at 70° C. for 24 hours to produce 11.2 gms. of substantially pure 2,4,5-triamino-6-hydroxy-pyrimidine sulfate; yield 94.5% of theory.

Example 2

Seven and seventy-five hundredths grams (0.05 mole) of 2,4-diamino-5-nitroso-6-hydroxy-pyrimidine were placed in a 500 ml. hydrogenation bottle and 100 ml. of aqueous 0.5 N sodium hydroxide were added. Two and five-tenths grams of reduced palladium on Darco G-60 catalyst (5% Pd) were added, and the mixture was allowed to shake under 20-40 lb. hydrogen pressure until no more hydrogen absorption took place. A pressure drop of 19.5 lbs. was observed to take place in 121 minutes. A drop of 18.8 lbs. corresponded to 0.10 mole of hydrogen. Two grams of sodium hydroxide were dissolved in the reaction mixture. The mixture was filtered, the filtrate being run directly into 25 ml. of aqueous 18 N sulfuric acid solution. The product precipitated almost immediately. The mixture was cooled to 0-10° and the product was recovered by filtration. The filter cake was washed with three 15-ml. portions of water and was dried in air at 70° C. for 24 hours to produce 11.3 gms. of substantially pure 2,4,5-triamino-6-hydroxy-pyrimidine sulfate; yield 95.1% of theory.

Example 3

Seven and seven-tenths grams (0.05 mole) of 2,4-diamino-5-nitroso-6-hydroxypyrimidine were placed in a 500 ml. hydrogenation bottle and 100 ml. of aqueous 0.1 N sodium hydroxide were added. Two and five-tenths grams of reduced palladium on Darco G-60 catalyst (5% Pd) were added, and the mixture was allowed to shake under 20-40 lb. hydrogen pressure until no more hydrogen was absorbed. A pressure drop of 17.9 lbs. was observed to take place in 31 minutes. A drop of 18.8 lbs. corresponded to 0.10 mole of hydrogen. The mixture was filtered, the filtrate being run directly into 25 ml. of aqueous 18 N sulfuric acid solution. The filter cake was washed with 125 ml. of aqueous N sodium hydroxide, the washings being run into the sulfuric acid solution. The product precipitated almost immediately. The mixture was cooled in an ice-bath to 0-10° and the product was recovered by filtration. The filter cake was washed with three 15-ml. portions of water and was dried in air at 70° C. for 24 hours to produce 11.2 gms. of substantially pure 2,4,5 - triamino-6-hydroxy-pyrimidine sulfate; yield 94.5% of theory.

Example 4

Seven and seven-tenths grams (0.05 mole) of 2,4-diamino-5-nitroso-6-hydroxypyrimidine were placed in a 500 ml. hydrogenation bottle and 125 ml. of aqueous N sodium hydroxide were added. Two-tenths grams of platinum oxide catalyst were added, and the mixture was allowed to shake under 20-40 lb. hydrogen pressure until no more hydrogen was absorbed. A pressure drop of 18.5 lbs. was observed to take place in 49 minutes. A drop of 19 lbs. corresponded to 0.10 mole of hydrogen. No further pressure drop was observed after 6 additional minutes. The mixture was filtered, the filtrate being run directly into 25 ml. of aqueous 18 N sulfuric acid solution. The mixture was then cooled to 0-10° and the product was recovered by filtration. The filter cake was washed with three 15-ml. portions of water and was dried in air at 70° C. for 25 hours to produce 11.6 gms. of substantially pure 2,4,5-triamino-6-hydroxypyrimidine sulfate; yield 97.5% of theory.

Example 5

Seven and seven-tenths grams (0.05 mole) of 2,4-diamino-5-nitroso-6-hydroxypyrimidine were placed in a 500 ml. hydrogenation bottle and 125 ml. of aqueous N sodium hydroxide were added. About seven-tenths grams of Raney nickel were added, and the mixture was allowed to shake under 20-40 lb. hydrogen pressure until no more hydrogen was absorbed. A pressure drop of 18 lbs. was observed to take place in 59 minutes. A drop of 19 lbs. corresponded to 0.10 mole of hydrogen. No further pressure drop was observed after 20 additional minutes. The mixture was filtered, the filtrate being run directly into 25 ml. of aqueous 18 N sulfuric acid solution. A precipitate formed almost immediately. The mixture was cooled in an ice-bath to 0-10° and the product was recovered by filtration. The filter cake was washed with three 15 ml. portions of water and was dried to produce 11.7 gms. of substantially pure 2,4,5 - triamino-6-hydroxy-pyrimidine sulfate; yield 98.4% of theory.

Modifications may be made in carrying out the present invention without departing from the spirit and scope thereof and the invention is to be limited only by the appended claims.

We claim:

1. The process of preparing 2,4,5-triamino-6-hydroxy-pyrimidine which comprises reacting 2,4-diamino-5-nitroso - 6 - hydroxy-pyrimidine with hydrogen and a hydrogenation catalyst, in the presence of an aqueous alkaline solution.

2. The process of preparing 2,4,5-triamino-6-hydroxy-pyrimidine which comprises reacting 2,4-diamino-5-nitroso-6 - hydroxy - pyrimidine with hydrogen and palladium catalyst, in the presence of an aqueous alkaline solution.

3. The process of preparing 2,4,5-triamino-6-hydroxy-pyrimidine which comprises reacting 2,4-diamino-5-nitroso - 6 - hydroxy-pyrimidine with hydrogen and platinum oxide catalyst, in the presence of an aqueous alkaline solution.

4. The process of preparing 2,4,5-triamino-6-hydroxy-pyrimidine which comprises reacting 2,4-diamino-5-nitroso - 6 - hydroxy-pyrimidine with hydrogen and Raney nickel catalyst, in the presence of an aqueous alkaline solution.

5. The process of preparing 2,4,5-triamino-6-hydroxy-pyrimidine which comprises reacting 2,4-diamino-5-nitroso-6-hydroxy-pyrimidine with hydrogen and palladium catalyst, in the presence of aqueous sodium hydroxide solution.

6. The process of preparing 2,4,5-triamino-6-hydroxy-pyrimidine which comprises reacting 2,4-diamino-5-nitroso-6-hydroxy-pyrimidine with hydrogen and platinum oxide catalyst, in the presence of aqueous sodium hydroxide solution.

7. The process of preparing 2,4,5-triamino-6-hydroxy-pyrimidine which comprises reacting 2,4-diamino-5-nitroso-6-hydroxy-pyrimidine with hydrogen and Raney nickel catalyst in the presence of aqueous sodium hydroxide solution.

8. The process which comprises reacting, at a temperature below about 75° C., 2,4-diamino-5-nitroso-6-hydroxy-pyrimidine with hydrogen and a hydrogenation catalyst, in the presence of a dilute aqueous alkaline solution, separating the reaction solution from the insoluble catalyst, acidifying said solution with a mineral acid, and crystallizing the corresponding mineral acid salt of 2,4,5-triamino-6-hydroxy-pyrimidine, in substantially pure form, from said acidified solution.

9. The process which comprises reacting, at a temperature below about 75° C., 2,4-diamino-5-nitroso-6-hydroxy-pyrimidine with hydrogen and palladium catalyst, in the presence of a dilute aqueous alkaline solution, separating the reaction solution from the insoluble catalyst, acidifying said solution with sulfuric acid, and crystallizing 2,4,5-triamino-6-hydroxy-pyrimidine sulfate, in substantially pure form, from said acidified solution.

10. The process which comprises reacting, at a temperature below about 75° C., 2,4-diamino-5-nitroso-6-hydroxy-pyrimidine with hydrogen and platinum oxide catalyst, in the presence of a dilute aqueous alkaline solution, separating the reaction solution from the insoluble, catalyst acidifying said solution with sulfuric acid, and crystallizing 2,4,5-triamino-6-hydroxy-pyrimidine sulfate, in substantially pure form, from said acidified solution.

11. The process which comprises reacting, at a temperature below about 75° C., 2,4-diamino-5-nitroso-6-hydroxy-primidine with hydrogen and Raney nickel catalyst, in the presence of a dilute aqueous alkaline solution, separating the reaction solution from the insoluble catalyst, acidifying said solution with sulfuric acid, and crystallizing 2,4,5-triamino-6-hydroxy-pyrimidine sulfate in substantially pure form, from said acidified solution.

RALPH MOZINGO.
GUNTHER S. FONKEN.